Aug. 16, 1966    E. F. ABRAMS ETAL    3,266,320

VECTOR BALANCED PRESSURE RATIO TRANSDUCER

Filed June 13, 1963    3 Sheets-Sheet 1

EDWARD F. ABRAMS
WILLIAM C. PLUNK
ALEXANDER SILVER
        INVENTORS

BY Donald R. Nyflagen

ATTORNEY

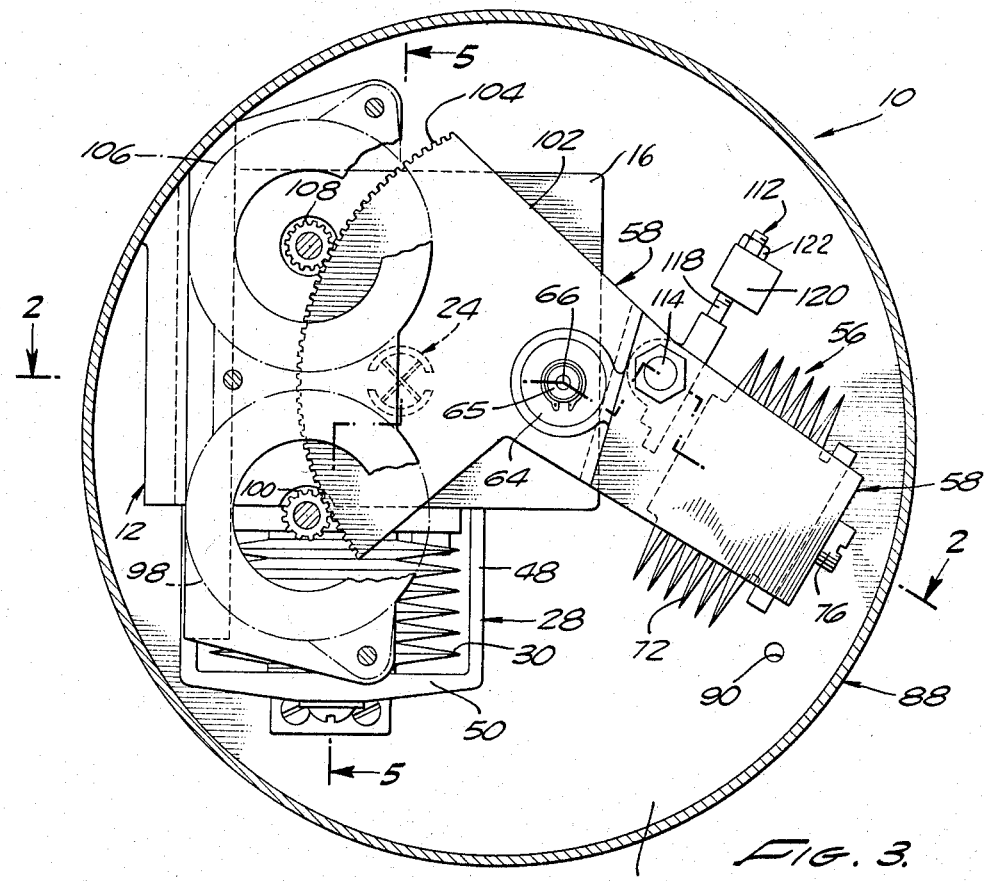
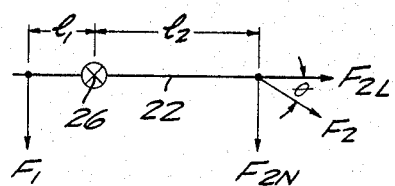
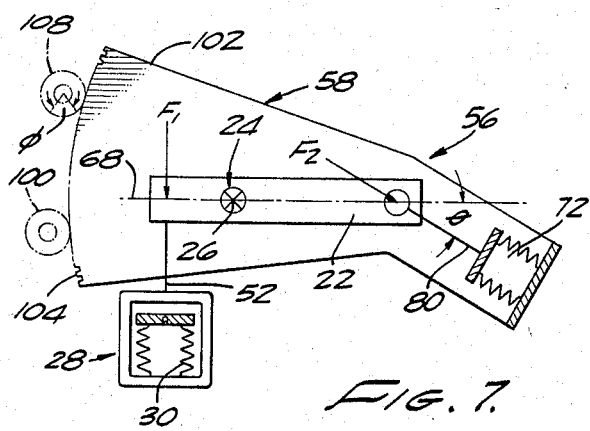
FIG. 3.
FIG. 6.
FIG. 7.
EDWARD F. ABRAMS
WILLIAM C. PLUNK
ALEXANDER SILVER
INVENTORS
BY
ATTORNEY Aug. 16, 1966  E. F. ABRAMS ETAL  3,266,320
VECTOR BALANCED PRESSURE RATIO TRANSDUCER
Filed June 13, 1963  3 Sheets-Sheet 3
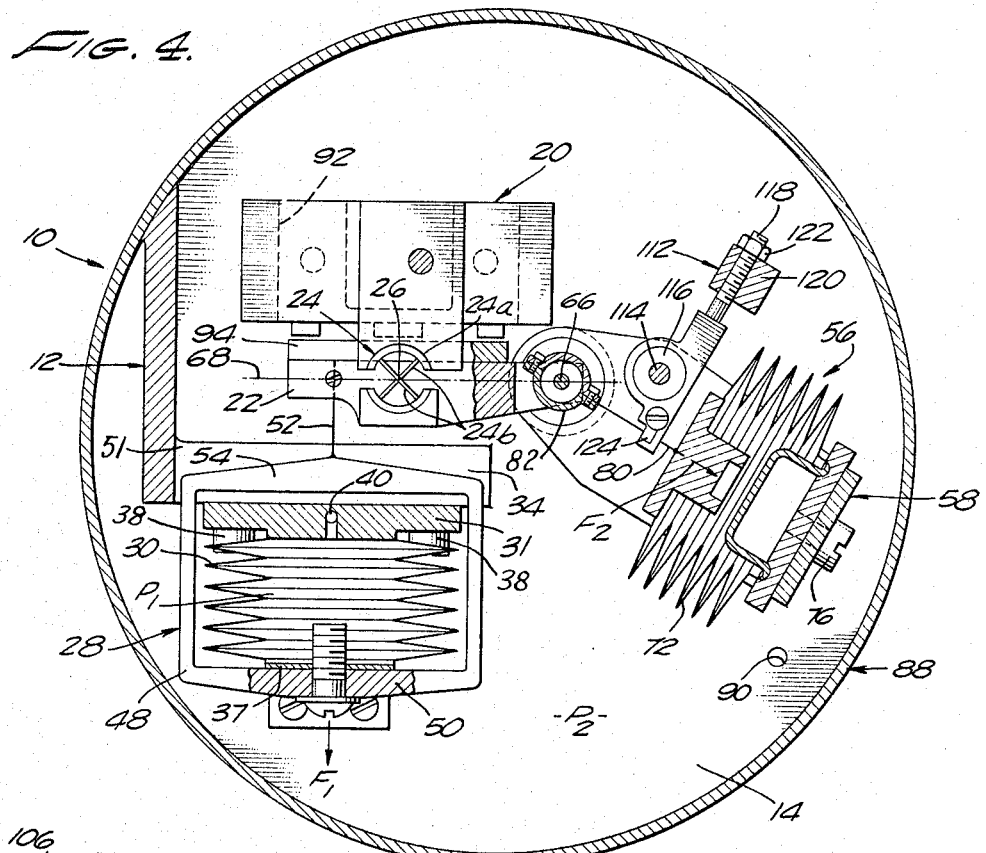
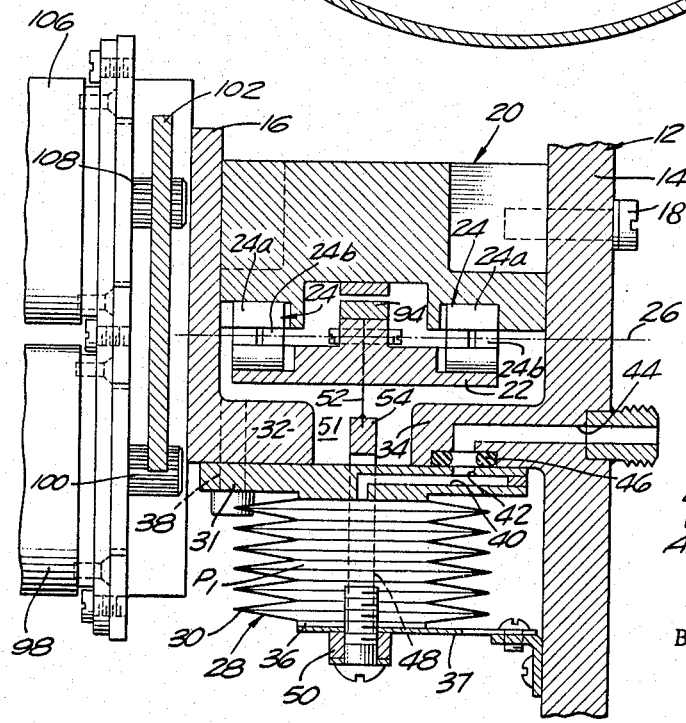
EDWARD F. ABRAMS
WILLIAM C. PLUNK
ALEXANDER SILVER
INVENTORS
BY
ATTORNEY

United States Patent Office 3,266,320
Patented August 16, 1966

1

3,266,320
VECTOR BALANCED PRESSURE RATIO
TRANSDUCER
Edward F. Abrams, Los Angeles, William C. Plunk, San Pedro, and Alexander Silver, Tarzana, Calif., assignors to The Garrett Corporation, Los Angeles, Calif., a corporation of California
Filed June 13, 1963, Ser. No. 287,582
3 Claims. (Cl. 73—407)

This invention relates generally to force balance instruments of the balanced beam type. The invention relates more particularly to a force balance instrument of this type wherein the balance beam is restored to balance in response to a change in a monitored force by adjusting the angle between the longitudinal axis of the beam and the line of action or vector of a force active on the beam.

Force balance instruments of the balanced beam type are well known in the art and are commonly employed to monitor or measure fluid pressure and fluid pressure ratios. A typical force balance instrument of this type is equipped with a balance beam rockably supported on a fulcrum, means for exerting opposing forces, including the force or forces to be monitored, on the beam in such manner that the forces produce opposing moments on the beam, and means for regulating the balance of the beam, to restore the latter to balance in its neutral position following a change in a monitored force. Generally, the instrument is equipped with feed-back means for operating the balancing means automatically in response to displacement of the beam from its neutral position, thereby to normally maintain the beam in balance in its neutral position.

In the existing force balance instruments of the kind under discussion, the beam is balanced either by shifting the fulcrum of the beam lengthwise of the latter so as to regulate the relative lever arm lengths of the forces active on the beam or by regulating the magnitude of one of the forces. While these existing instruments are capable of satisfactory operation in many applications, they possess certain inherent deficiencies which this invention seeks to overcome. The existing instruments, for example, are excessively complex in construction and costly to manufacture. The existing instruments also have relatively low inherent accuracy; that is to say, manufacture of the existing instruments involves a large number of machining and assembly operations which must be performed with a very high degree of precision to attain the high over-all instrument accuracy demanded in many force monitoring or measuring applications. Further, the existing instruments are difficult to counterbalance with sufficient accuracy to provide the instruments with triaxial insensitivity to environmental acceleration forces. Finally, the existing instruments possess relatively low environmental resistance; that is the instruments are prone to damage by relatively low order environmental acceleration forces.

In the case of the existing force balance instruments with movable fulcrums, the foregoing deficiencies result primarily from the movable carriage and rails which are required to support the fulcrum for movement along the beam and which are extremely difficult to machine and assemble with sufficient precision to attain the high over-all operational accuracy demanded in many force monitoring applications. Moreover, even though initially fabricated with sufficient precision to attain such high operational accuracy, the fulcrum supporting carriage and rails have low environmental resistance.

A general object of this invention is to provide an improved force balance instrument of the balanced beam type which avoids the foregoing and other deficiencies of the existing force balance instruments of this type.

2

Another object of the invention is to provide a force balance instrument of the character described wherein the balance beam is restored to balance in response to a change in monitored force by regulating the angle between the longitudinal axis of the instrument balance beam and the line of action as vector of a force active on the beam.

An object of the invention associated with the foregoing object is to provide a force balance instrument wherein the output of the instrument is a sine function of the force quantity monitored by the instrument.

A further object of the invention is to provide a vector balanced force balance instrument of the character described wherein all internal motions are rotary rather than rectilinear, whereby the instrument is relatively simple in construction, economical to manufacture, rugged, requires a minimum number of precision machining and assembly operations, possesses a relatively high inherent accuracy and environmental resistance, and is otherwise superior to the existing force balance instruments of the balance beam type.

Other objects, advantages, and features of the invention will become apparent to those skilled in the art as the description proceeds.

Briefly, the objects of the invention are attained by providing a force balance instrument equipped with a balance beam rockably supported on a fixed fulcrum, preferably comprising flexure means possessing high environmental resistance. Operatively connected to the beam are force applying means for producing on the beam opposing moments including a moment proportional to a force to be monitored or measured. One of these force applying means is pivotally attached to the beam to permit adjustment of the angle between the longitudinal axis of the beam and the direction line or vector of the force exerted on the beam by said latter means. Adjustment of this angle regulates the magnitude of the component of the latter force normal to the beam and, thereby, the moment produced on the beam by the latter force.

The angularly adjustable force applying means of the instrument is positioned by a balancing mechanism including a rotary shaft. In a typical force balance instrument according to the invention, this shaft is driven by a servomotor controlled by a feed-back system which is responsive to displacement of the beam from its neutral position and operates to maintain the beam in balance in its neutral position by regulating the angle of the adjustable force applying means.

The invention will be better understood from the following detailed description of a presently preferred embodiment thereof taken in connection with the attached drawings, wherein:

FIG. 3 is a section taken on line 3—3 in FIG. 2;

FIG. 4 is a section taken on line 4—4 in FIG. 2;

FIG. 5 is a section taken on line 5—5 in FIG. 3;

FIG. 6 is a force balance diagram of the instrument; and

FIG. 7 is a diagrammatic illustration of the instrument.

Figure 2:
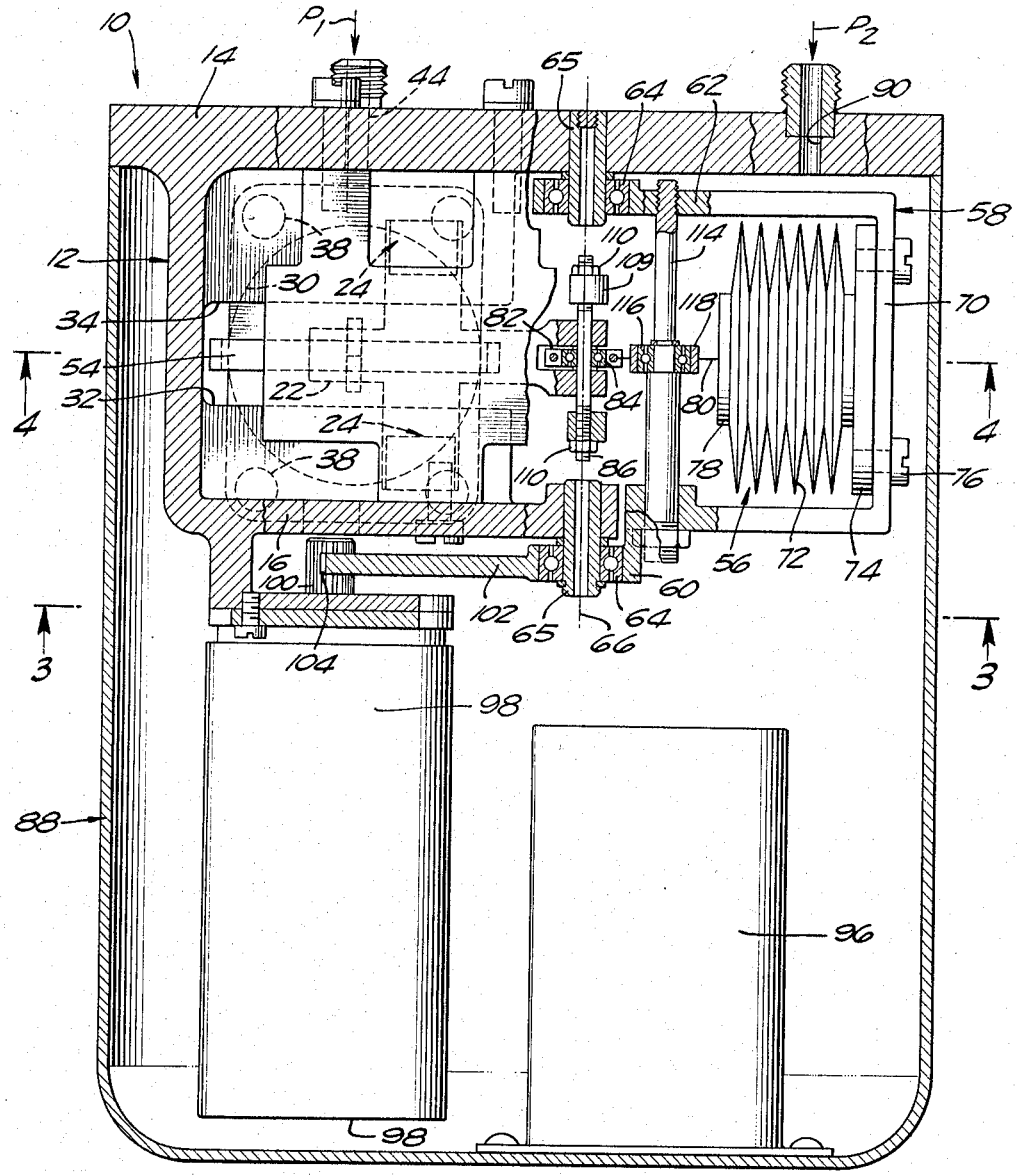
FIG. 2 is an enlarged section through the instrument in FIG. 1, the section being taken on line 2—2 in FIG. 3.
Figure 1:
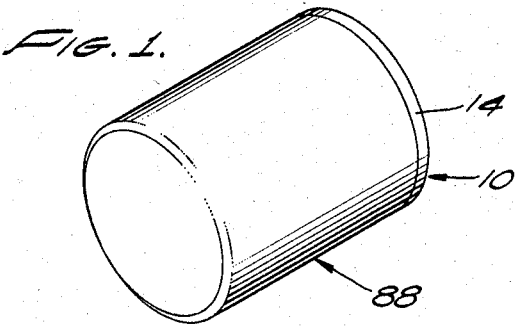
FIG. 1 is a perspective view of the hermetic case enclosing the present force balance instrument.

The force balance instrument 10 illustrated in these drawings comprises a frame 12 including spaced parallel side walls 14 and 16. Situated between these walls, and attached to the latter by bolts 18, is a supporting platform 20. Below the platform 20, as the instrument is viewed in FIG. 4, is a balance beam 22. Balance beam 22 is pivotally supported on the underside of the platform 20 by fulcrum means 24 for rocking on an axis 26 normal to the beam and to the frame side walls 14 and 16. While various types of fulcrum means may be used to support the balance beam, the fulcrum means 24 illustrated in the drawings are of the conventional flexure type and comprise separate fulcrum elements 24a each including crossed flexures 24b which are anchored at one end to the platform 20 and at the other end to the beam 22.

Operatively connected to one end of the balance beam 22 is a first force applying means 28. This force applying means comprises a flexible bellows 30, the upper end of which as it is viewed in FIG. 5, is sealed to the under surface of a mounting plate 31. Mounting plate 31, in turn, seats against the under surfaces of a pair of flanges 32 and 34 which project inwardly toward one another from the frame side walls 14 and 16. It will be observed that the flanges 32, 34 are spaced a distance below the supporting platform 20 to accommodate the balance beam 22 therebetween. The lower end of the bellows 30 is sealed by an end wall 36 and is anchored to frame wall 14 by a flexure 37.

Bellows mounting plate 31 is secured to the frame flanges 32 and 34 by bolts 38 and is formed with a fluid passage 40 which opens at one end to the interior of the bellows 30. Passage 40 opens through the upper surface of the mounting plate 31 via a port 42. Port 42 registers with one end of a fluid passage 44 in the frame flange 34, the other end of which latter passage opens through the outer surface of the frame side wall 14 for communication to a fluid pressure source to be monitored. A seal ring 46 seals the flange 34 to the bellows mounting plate 31 about the port 42 and passage 44.

Bellows 30 is encompassed by an open rectangular frame 48, the lower cross member 50 of which is attached to the lower wall 36 of the bellows. The upper end of the bellows frame 48 projects through the space 51 between the frame flanges 32, 34 and is connected to the balance beam 22 by a wire flexure 52 which is anchored at one end to the upper cross member 54 of the bellows frame 48 and at the other end to the adjacent end of the beam. It is evident therefore, that fluid pressure in the bellows 30 creates on the beam 22 a force which produces a counterclockwise moment on the beam as the latter is viewed in FIG. 4.

Generally denoted by the numeral 56 is a second force applying means for exerting on the balance beam 22 a second force which produces a clockwise moment on the beam opposing the counterclockwise moment produced by the bellows 30. Force applying means 56 comprises a pivotal frame or sector 58 including spaced arms 60 and 62 having coaxial bores in which are fixed the outer races of ball bearings 64. The inner races of these bearings are fixed on coaxial shafts 65 which are mounted in the instrument frame walls 14 and 16 on a common axis 66 located in a plane containing the longitudinal axis 68 of the balance beam 22. Sector 58 is thus pivotally mounted on the instrument frame 12 for turning on the axis 66.

The arms 60 and 62 of the sector 58 are joined by a cross member 70. Located between the sector arms is a flexible bellows 72 having a mounting plate 74 seating against the sector cross member 70 and attached to the latter by bolts 76. The opposite end of the bellows 72 is sealed by an end wall 78 to which is anchored one end of a wire flexure 80. The opposite end of the flexure 80 is anchored to a bearing retainer ring 82 situated in a slot in the adjacent end of the balance beam 22. Retainer ring 82 has a bore therethrough in which is fixed the outer race of a ball bearing 84. The inner race of this bearing is fixed to a shaft 86 carried by the balance beam. Shaft 86 is located so that in one position of the balance beam, hereinafter referred to as its neutral position, the shaft is coaxial with the sector pivot axis 66.

The entire force balance instrument 10 is enclosed in a hermetic case 88 which is sealed to the instrument frame wall 14. Extending through the latter wall and opening to the interior of the case 88 is a fluid passage 90 adapted for communication to a source of a second fluid pressure to be monitored. Bellows 72 on the sector 58 is evacuated and exposed to the internal pressure in the case. Bellows 30, of course, is also exposed to the internal pressure in the case.

Referring to FIGS. 4, 6 and 7, it is evident that if we assume the pressure $P_1$ in the bellows 30 exceeds the pressure $P_2$ in the instrument case 88, the bellows 30 exerts on the balance beam 22 a force $F_1$ which produces a counterclockwise moment on the beam about the axis 26. As a consequence of the internal case pressure $P_2$ on the evacuated bellows 72, the latter exerts on the beam a force $F_2$ which produces on the beam a clockwise moment opposing the moment produced by bellows 30. The force $F_2$ exerted by the bellows 72 can be resolved into two components, one ($F_{2N}$) acting normal to the beam and the other ($F_{2L}$) acting longitudinally of the beam. Only the normal force component $F_{2N}$, of course, is effective to produce a clockwise moment on the balance beam 22. This normal force component, moreover, is a sine function of the bellows force $F_2$, or, in other words $$F_{2N} = F_2 \sin \theta$$

where $\theta$ is the angle between the longitudinnal axis 68 of the balance beam and the line of action or vector of the force $F_2$. Thus, for any given value of the force $F_2$, corresponding to a particular pressure $P_2$ in the instrument case 88, the clockwise moment produced on the balance beam 22 by the bellows 72 is varied by adjusting the angle $\theta$, the moment increasing as the angle increases and decreasing as the angle decreases.

Adjustment of the angle $\theta$ is effected by rotating the sector 58, thereby to angularly adjust the bellows 72 with respect to the balance beam 22 about the pivotal connection i.e. shaft 86, between the beam and the bellows 72. It is evident, therefore, that the beam 22 may be balanced in its neutral position, or restored to balance in its neutral position, by properly angularly positioning the bellows 72 by rotation of the sector 58.

As is customary in force balance instruments of the balanced beam type, the balance beam 22 in the present instrument 10 is automatically maintained in balance. To this end, there is mounted on the supporting platform 20 of the instrument a differential transformer 92, the armature 94 of which is fixed to the balance beam. Transformer 92 generates an electrical feed-back signal, in the well known way, the phase and amplitude of which is related to the displacement of the balance beam 22 from its neutral position. Coupled to the transformer 92 is a servo-amplifier 96 for amplifying the feed-back signal. The output of this amplifier, in turn, is coupled to a reversible servomotor 98. The amplifier and the servomotor are mounted within the instrument case 88 in the positions shown.

The shaft of the servomotor 98 turns on an axis parallel to the turning axis 66 of the sector 58 and mounts a pinion 100. Sector 58 includes a coaxial gear segment 102 integral with the sector arm 60 and formed along its curved edge with gear teeth 104 which mesh with the gear teeth on the motor shaft pinion 100. Thus, the sector 58 can be rotated by motor 98 in either direction on its axis 66, to adjust the angle $\theta$ between the longitudinal axis 68 of the balance beam 22 and the direction line of the force $F_2$ exerted on the beam by the sector bellows 72, thereby to balance the beam in its neutral position, as explained earlier.

Also mounted within the instrument case 88 is a synchro generator 106, the shaft of which turns on an axis parallel to the sector turning axis 66 and mounts a pinion 108 which also meshes with the sector gear teeth 104. Thus, the synchro is driven by the sector 58, when the latter is driven by the servomotor 98, and generates an output related to the angular position of the sector. The leads for the amplifier 96 and the synchro 106 are brought to the exterior of the instrument case 88.

In order to attain maximum accuracy and sensitivity in the instrument, the various movable parts thereof, such as the balance beam 22 and the sector 58, must be accurately balanced. Moreover, if the instrument is designed to operate in an environment in which it is subjected to acceleration and deceleration forces, the instrument must be counterbalanced in such a way as to balance out acceleration forces. To this end, the ends of the shaft 86 carried by the balance beam 22 are threaded. On these ends of the shaft are threaded eccentric counterweights 109 and jam nuts 110. The beam is balanced transversely about its longitudinal center line by adjusting the counterweights 109 toward or away from the beam, as necessary to achieve the proper balance. Since the counterweights 109 are eccentric, rotation of the weights is effective to shift the center of mass of the beam lengthwise of the latter so that the beam may be balanced about its pivot axis 26 by angular adjustment of the counterweights. In thus balancing the beam about its pivot axis, the mass of the bellows 30 is taken into account so that when the beam is properly balanced, the resultant of the forces active on the beam and the bellows 30, during acceleration of the instrument in a direction parallel to the axis of the latter bellows passes through the pivot axis of the beam.

Mounted on the sector 58 is a counterbalance 112 for the sector and its bellows 72. Counterbalance 112 comprises a shaft 114 which extends between and is threaded in the sector arms 60 and 62, as shown. Rotatably mounted intermediate its ends, by a ball bearing 116, on the center of shaft 114 is an arm 118 on one end of which is threaded an eccentric counterweight 120 and a jam nut 122. The other end of arm 118 carries a clamp 124 which grips the flexure wire 80 extending between the bellows 72 and the beam 22.

Acceleration forces on the sector bellows 72 in the direction of the bellows axis are balanced out by properly positioning the counterweight 120 in the longitudinal direction of the arm 118. Since the counterweight 120 is eccentric, rotation of the weight is effective to shift the center of mass of the sector 58 in the axial direction of the bellows, whereby, if the sector is properly designed, its center of mass may be adjusted to a position on its pivot axis 66.

Thus, the instrument 10 may be rendered relatively insensitive to acceleration forces in all directions by properly adjusting the counterweights 109 and 120.

In operation, fluid pressure $P_1$ from one source is admitted to the bellows 30 through passage 44 and fluid pressure $P_2$ from a second source is admitted to the interior of the instrument case through passage 90. As a result of the action of these fluid pressures on the bellows 30 and 72, the later exert on the balance beam 22 forces $F_1$ and $F_2$ which produce opposing moments on the beam. Displacement of the beam from its neutral position in response to a change in the relative magnitude of the pressures $P_1$ and $P_2$ causes the differential transformer 92 to generate a feed-back signal related to the direction and magnitude of the displacement. This signal is amplified by the amplifier 96 and energizes the servo-motor 98 in a direction to rotate the sector 58 in the proper direction to restore the beam to balance in its neutral position.

Referring to FIGS. 6 and 7, it is evident that when the beam 22 is balanced in its neutral position, the following relationships exist:

If we let $\phi$ equal the total angle of rotation of the shaft of synchro 106 from a zero reference position in which the angle $\theta$ between the longitudinal axis of the beam 22 and the line of action of force $F_2$ equals zero, such that $\phi=0$ when $\theta=0$, it is evident that $$\phi = K_1 \theta \quad (1)$$

where $K_1$ is the ratio of the pitch diameter of the sector gear 104 to the pitch diameter of the synchro shaft pinion 108.

Further, since the beam 22 is balanced in its neutral position $$F_1 l_1 = F_{2N} l_2 \quad (2)$$

If the bellows 30 and 72 are assumed to be identical, Equation 3 can be rewritten as $$(P_1 - P_2) A l_1 = P_2 A l_2 \sin \theta \quad (3)$$

where A is the area of each bellows. Combining Equations 1 and 3 and rewriting, we obtain $$K_2 \left( \frac{P_1 - P_2}{P_2} \right) = \sin \theta = \sin \frac{\phi}{K_1} \quad (4)$$

where $$K_2 = \frac{l_1}{l_2}$$

From Equation 4 we obtain $$\phi = K_1 \text{ arc-sine} \left( K_2 \frac{P_1}{P_2} - K_2 \right) \quad (5)$$

It is evident from Equation 5 that the synchro 106 of the present force balance instrument provides an output signal which is a sine function of the ratio of the pressures $P_1$ and $P_2$ being monitored. This output signal may be used directly to operate an external mechanism, for example, or it may be fed to an external conversion device for converting the signal to linear function of the pressure ratio $P_1/P_2$. Since the flexures 52 and 80 which connect the bellows 30 and 72 to the balance beam 22 can transmit both tension and compression forces, the present force balance instrument is capable of operation when the pressure ratio $P_1/P_2$ is either greater or less than unity. It is further obvious that if the internal case pressure $P_2$ is maintained constant, the instrument will furnish an output related to the pressure $P_1$. In this case, the spring force of the sector bellows 72 furnishes the restoring force $F_2$ on the balance beam. In this latter operating mode, of course, the sector bellows may be replaced by a spring.

Various other modifications of the invention are possible within its spirit and scope.

We claim:
1. A force balance instrument comprising:
   a balance beam having a fulcrum;
   a first force applying means operatively connected to said beam for exerting on the latter a first force which produces a first moment in one direction on the beam;
   a frame pivotally mounted on an axis approximately parallel to the pivot axis of the beam;
   a second force applying means mounted on said frame;
   flexure means forming a connection between said second force applying means and said beam at a point thereon substantially on said pivotal axis of said frame whereby said second force applying means exerts on said beam a second force which produces on said beam a second moment opposing said first moment;
   an arm pivoted intermediate its end on said frame on an axis parallel to said pivot axis thereof and attached at one end to said flexure means; and
   an adjustable counterweight on the other end of said arm.

2. A pressure transducer, comprising:
   a supporting frame;
   a balance beam fulcrumed intermediate its end on said frame;
   a first flexible bellows attached at one end to said frame and means connecting the other end of said bellows to one end of said beam for exerting on the beam a first force which produces a first moment in one direction on the beam, said beam having a neutral position wherein the longitudinal axis of the beam is normal to the axis of said bellows;
   a second frame pivotally mounted on said supporting frame on an axis parallel to the pivot axis of said beam and disposed in common longitudinal plane of the beam with the latter axis when the beam occupies said neutral position;

a second flexible bellows attached at one end to said second frame and flexure means pivotally connecting the other end of said second bellows to said beam on a pivot axis which is substantially aligned with the pivot axis of said second frame when said beam occupies said neutral position, the axis of said second bellows extending radially of the pivot axis of said last mentioned pivotal connecting means, whereby rotation of said second frame about its pivot axis is effective to adjust the angle between the longitudinal axis of said beam and the line of action of the force exerted on the beam by said second bellows, and said second frame is rotatable to a position wherein the moment produced on the beam by the last mentioned force is equal and opposite to said first moment, said second frame including a coaxial gear segment;

an arm pivoted intermediate its ends on said second frame on an axis parallel to the pivot axis of the frame, and attached at one end to said flexure means;

an adjustable counterweight on the other end of said arm;

means responsive to displacement of said beam from said neutral position for generating a feed-back signal related to said displacement;

means including a servomotor responsive to said signal and a gear on the shaft of said motor meshing with said gear segment for angularly driving said second frame to maintain said beam in balance in said neutral position; and means including a gear meshing with said gear segment for generating an output signal related to said angle.

3. The subject matter of claim 2 including:

a threaded shaft carried by one end of said beam parallel to its pivot axis; and an eccentric counterweight threaded on said shaft.

References Cited by the Examiner

UNITED STATES PATENTS

| 2,923,153 | 2/1960 | Westman | 73—182 |
| 3,038,339 | 6/1962 | Colvin | 73—407 |
| 3,049,007 | 8/1962 | Joline | 73—182 |

FOREIGN PATENTS

| 681,544 | 9/1939 | Germany. |

LOUIS R. PRINCE, *Primary Examiner.*

D. O. WOODIEL, *Assistant Examiner.*